Aug. 11, 1959    G. F. ROMANO    2,899,567
HIGH-SPEED SWITCHING SYSTEM
Filed Dec. 31, 1957    2 Sheets-Sheet 2

INVENTOR.
George F. Romano
BY
ATTORNEY

United States Patent Office 2,899,567
Patented Aug. 11, 1959

2,899,567

HIGH-SPEED SWITCHING SYSTEM

George F. Romano, Winter Park, Fla., assignor to The Martin Company, a corporation of Maryland Application December 31, 1957, Serial No. 706,426

4 Claims. (Cl. 307—81)

The present invention relates to an electro-mechanical system for individually switching a plurality of input electrical circuits in sequence into an output circuit, and more particularly to such a system wherein the time required for switching the input circuits is not limited by the operating time constant of the mechanical switches employed.

The present invention has for its object the provision of a high-speed electromechanical switching system which is compact, inexpensive, rugged, and in all ways compatible with the severe demands of aircraft usage. Heretofore high-speed electromechanical switching was effected either by a motor-driven rotary commutator switch which sequentially intercepts a plurality of circumferentially mounted contacts, or by means of high-speed electromagnetic relays designed to have an extremely short operating time. Rotary commutator switches are handicapped for many operations in that they generate excessive electrical switching noise. The quieter high-speed relays, on the other hand, are bulky, expensive, and highly sensitive to shock and vibration, thus rendering them impractical for many military applications.

To eliminate the need for using such high-speed switching devices the invention provides a system wherein the time required for switching from circuit to circuit is not limited by the operating time constant of the switches employed. In this way, for example, conventional electromechanical relays may be utilized to effect high-speed switching. Such relays are relatively small, inexpensive, and capable of withstanding the severe environmental conditions imposed by aircraft usage.

In accordance with the invention a plurality of input circuits are divided among a predetermined smaller number of switching sections each having an input and an output. The input circuits are individually connected to the input of the switching section associated therewith and commonly connected to the output thereof. A separate switch having a movable contact is then connected in each of the input circuits and the switches associated with the same switching section are adapted to close in sequence, only one of the switches being adapted to close at one time.

The switching operation is controlled by means of a synchronizing circuit which is connected to each of the switching sections. This circuit is adapted to close a single switch at a time in each of the switching sections, cyclically in sequence from switching section to switching section. Further, the complete switching section cycle is preselected to permit a switch in any one switching section to completely close prior to the commencement of a succeeding cycle in the same switching section. In this way a plurality of switches equal in number to the number of switching sections may be initiated into operation during the time required for the closing of a single switch in any one of the switching sections.

To effect individual switching of the input circuits the invention further provides a plurality of gate circuits having input circuits each connected to the output of a separate one of the switching sections. The output of each gate circuit is connected into a common output circuit. A synchronizing circuit is then connected to the gate circuits and adapted to operate the gating circuits cyclically in sequence, only one of the gating circuits being adapted to operate at one time. Further, the synchronizing circuit is adapted to operate each of the gating circuits once during each switching section cycle. In this way the plurality of input circuits is individually switched in sequence into the common output circuit.

The invention will be further described in connection with the accompanying drawings illustrative of certain embodiments thereof, but it will be understood that the invention is not limited thereto.

Figure 1:
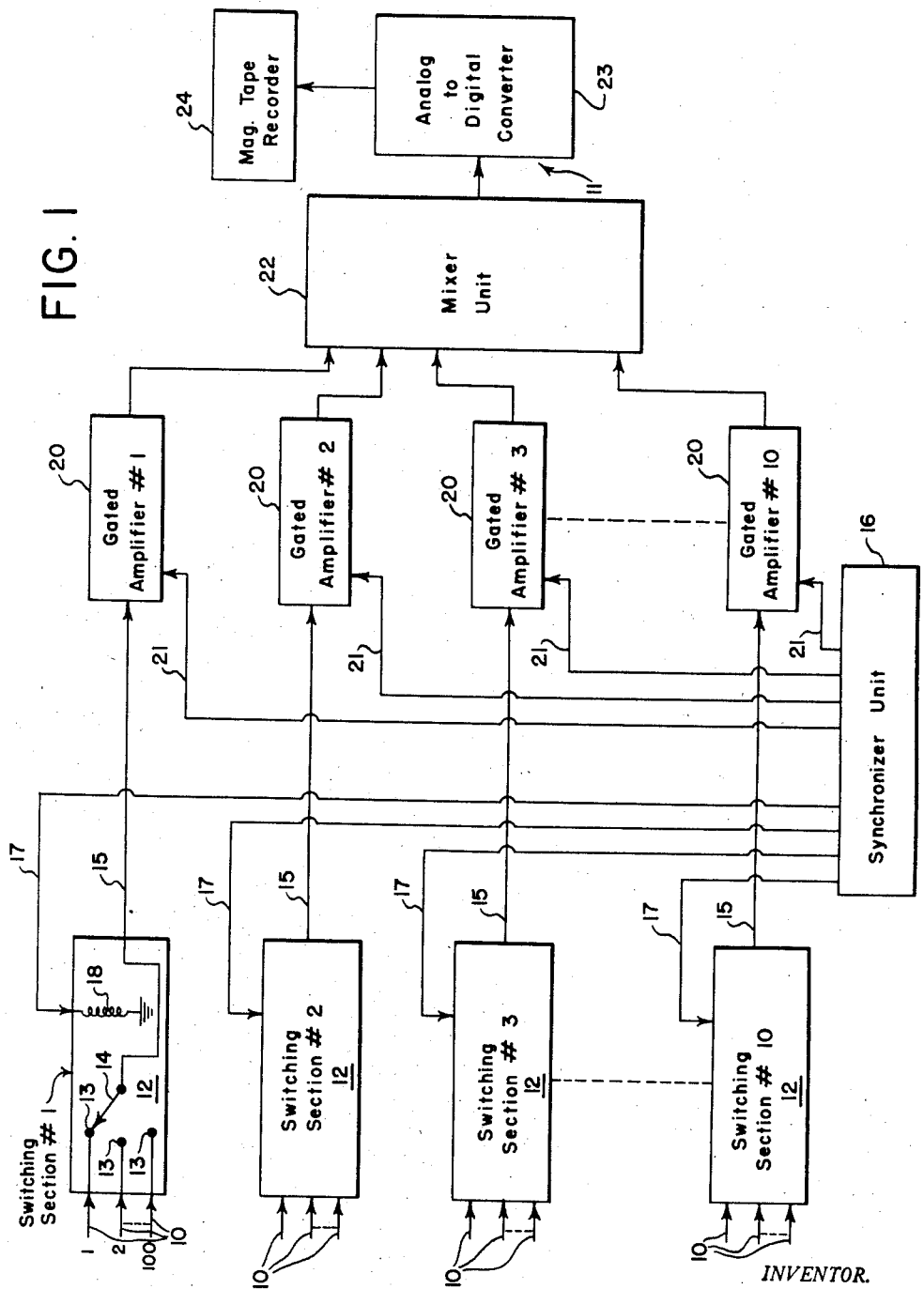
Fig. 1 is a block diagram of a high-speed switching system in accordance with the invention.

The particular embodiment of Fig. 1 is designed to switch one thousand input electrical circuits 10 into a common output circuit, indicated generally at 11, at a rate of one complete scan, that is, one thousand samples per second. To this end the input circuits are equally divided among ten switching sections 12. All switching sections are alike, only one being shown in detail. Each switching section has an input to which the one hundred input circuits associated therewith are individually connected. Further, the hundred input circuits are connected to the output of their associated switching section in common through a separate electromechanical switch having a movable contact in each input circuit. Such connection is schematically illustrated in Fig. 1 by means of a separate switching terminal 13 in each input circuit and a common switching arm 14 connected to a common output circuit 15. The switching arm 14 is adapted by means of an energizing coil 18 to move from terminal to terminal in sequence, thus connecting only one input circuit to the output circuit at any time.

If the system were required to wait for the movement of the switching arm 14 from terminal to terminal to effect an individual connection of the input circuits to the output circuit 11, it would be limited by the operating time of the switches employed. In the conventional electromechanical relay this operating time is in the area of 9 milliseconds. Thus, special high-speed switching would be required to effect the switching of one thousand input circuits at the specified rate of one complete scan per second.

The present invention, however, permits the individual switching at the specified rate even though conventional relays are employed. To this end the invention provides an electrical synchronizing unit 16. Such units are known in the art and need not be further described. The synchronizing unit is adapted to produce synchronizing voltages which are connected to each switching section through circuits 17. Each of these voltages is adapted to activate an energizing coil 18 so as to move the arm 14 from one terminal 13 to the succeeding terminal 13 of the input circuits. Thus successive applications of the voltages to a switching section close the switches therein in sequence with only one of the switches being closed at a time. Further, the voltages are distributed through the circuits 17 and in time so as to close one switch at a time in each of the switching sections cyclically in sequence from switching section to switching section, the total time interval required for a complete switching section cycle being preselected to permit a switch in any one switching section to completely close prior to the commencement of a succeeding cycle in that switching section.

Figure 2:
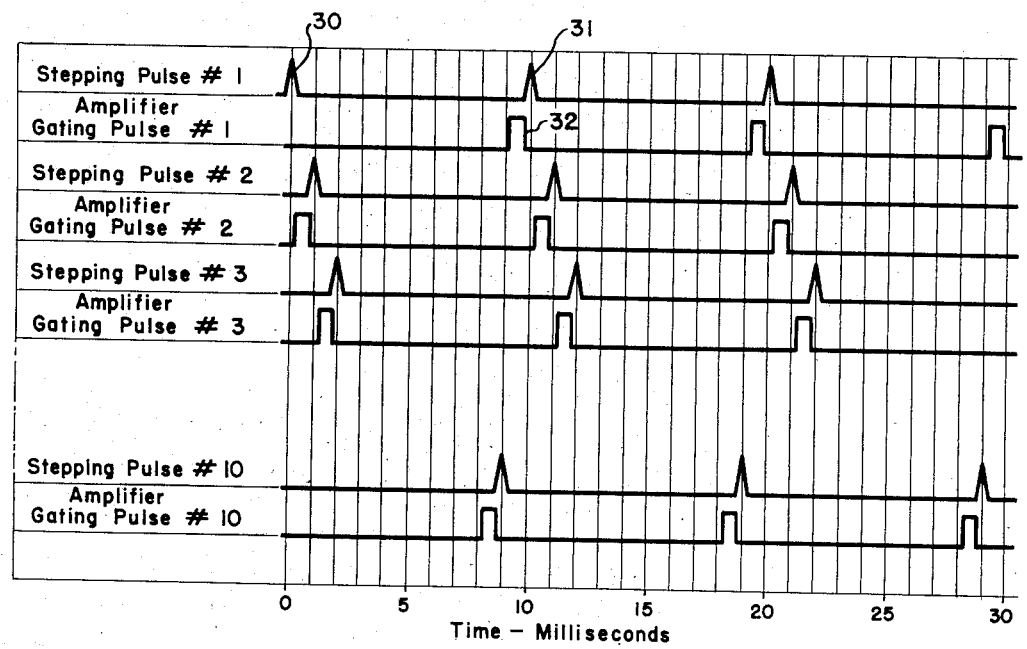
Fig. 2 is a timing chart related to the functioning of the system of Fig. 1.

This timing sequence is illustrated in the chart of Fig. 2 wherein the synchronizing voltages are illustrated in the form of sharp pulses labeled stepping pulses. It will be seen from this chart that the coil 18 in the first switching section is activated by the stepping pulse No. 1 connected thereto and that thereafter the activation occurs in the next switching section, and so on down the line. It is also seen that this operation is cyclical so that activation of the coil in the tenth switching section is followed by a return activation of the coil in the first switching section. In this way the system is capable of activating a plurality of switches corresponding in number to the number of switching sections during the time required for the operation of any one switch.

The time separation in the chart of Fig. 2 is selected to comply with the specified sampling rate of one thousand circuits per second. As illustrated, the stepping pulses applied to successive switching sections are separated in time by 1 millisecond. This results in the sampling of all one thousand switches within the specified time of one second. Further, this permits the stepping pulses applied to the same switching section to be separated in time by 10 milliseconds. Therefore, switches having an operating time of 9 milliseconds may be employed within the switching sections. Such operating time, as indicated, is well within the reach of conventional relay equipment.

Evidently, if the output of the switching sections 12 were to be connected directly to the single output circuit 11 individual switching would not be effected since a number of the switches are closed at the same time. To effect individual switching the invention further provides a separate gated amplifier circuit 20 for each switching section. Each gate circuit has an input circuit connected to the output of the switching section associated therewith and its output connected to a circuit in common with the other gating circuits. A gated amplifier of the conventional type such as illustrated and described on pages 603 and 604 of Radio Engineering, 3rd edition, by Terman, may be employed for this purpose.

The gate circuits are operated by means of synchronizing voltages from the unit 16 applied through circuits 21. The synchronizing voltages are distributed through the circuits 21 and in time to operate the gate circuits cyclically in sequence in synchronism with the cyclical operation of the switching sections 12. Further, the voltages are distributed in time to maintain only one of the gate circuits operative at one time and to operate each of the gate circuits once during each switching section cycle.

The synchronization of the gate circuits may be better understood by referring to the timing chart of Fig. 2 wherein the gate voltages are illustrated in the form of flat pulses labeled amplifier gating pulses. The chart shows that a specified time delay after the actuation of a switching section by a stepping pulse 30, and prior to the reactivation of that switching section by a subsequent stepping pulse 31, the gate circuit associated therewith is made operative by the application of a gating pulse 32. Thus, each gate circuit is operated once during each switching section cycle. The chart also shows that the gating pulses are applied to the gate circuits in sequence in synchronism with the stepping pulses and with no overlap in time. In this way the switching sections are connected to the common output of the gate circuits one at a time in sequence. Further, due to the fact that only one input circuit in each switching section is closed during a switching cycle, the action of the gate circuits results in the desired individual switching of the input circuits in sequence into the common output of the gate circuits.

In the particular embodiment of Fig. 1 the time delay between stepping pulse and gating pulse applied to associated switching section and gate circuit is approximately 9 milliseconds. This delay is the maximum permissible due to the specified sampling rate of one thousand circuits per second and is so selected in order to insure full closure of the activated switch in the switching section. A flat pulse approximately 0.6 millisecond wide is employed for the gating pulse to insure connection of the switching section to the output circuit of the gated amplifier.

The outputs of the gated amplifier 20 are advantageously individually applied to the input of a conventional mixer unit 22. The output of the mixer unit then is connected to the common output circuit shown generally at 11. The high-speed switching system of the invention may be advantageously employed, for example, for the recording of flight test data. For such function the common output circuit may comprise, as shown, an analog-to-digital converter 23 connected to a magnetic tape recorder 24.

It is thus seen that with the present invention it is possible to employ switches having an operating time of 9 milliseconds and yet to effect a switching operation which heretofore would have required expensive and unreliable high-speed switches having an operating time of 1 millisecond. Further, it is apparent that wide variations in input circuit capacity are possible with this system depending upon the operating time of the switches employed and the time required for the utilization of the output signals.

Figure 3:
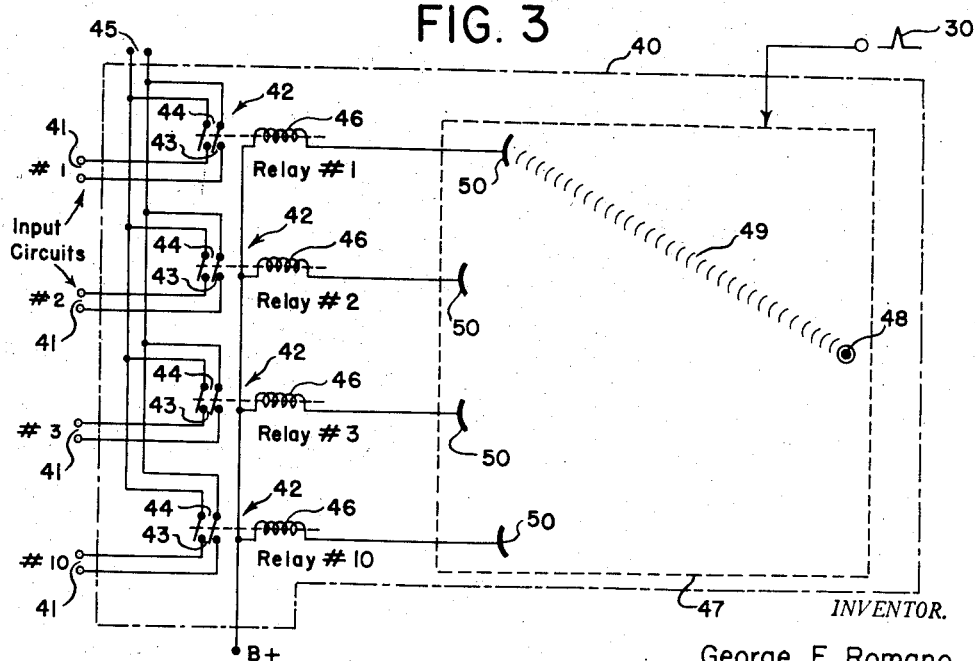
Fig. 3 is a schematic diagram of a switching section which may advantageously be employed in the system of Fig. 1.

Fig. 3 illustrates circuitry and components advantageously employed in each of the switching sections schematically illustrated in Fig. 1. The switching section 40 is adapted to switch ten two-wire input circuits 41 one at a time in sequence and as commanded by an input synchronizing voltage. To this end the switching section employs a separate, conventional, double-pole single-throw electromechanical relay 42 in each of the input circuits. The input contacts 43 of each relay are connected to their associated two-wire input electrical circuit, while the output contacts 44 of all the relays are connected in common to form a two-wire output circuit 45 leading to the gated amplifier associated with switching section 40. The electromagnetic coils 46 activating each relay are connected into a circuit component 47. This component is designed to operate the relays in sequence and to maintain only one relay closed at a time in response to the application of a pulse 30 from the synchronizing unit.

A circuit component which may be advantageously employed for this purpose is the magnetron beam switching tube of the Burroughs Corporation, Plainfield, New Jersey. An article describing this tube is to be found in the Journal of the British Institution of Radio Engineers, vol. XV, No. 7, July 1955, written by Sin-Pih Fan and entitled "The Magnetron Beam Switching Tube, Its Operation and Circuit Design Criteria." Such tube basically comprises a series of plates 50 and a cathode 48 adapted to produce a rotating electron beam 49. The tube is further adapted through the use of grids (not shown) to switch the electron beam from plate to plate at high speeds when so commanded by an input pulse. Thus the relays may be operated as specified by individually connecting coils 46 to the plates of the tube. The current provided by the tube is sufficient to operate the relay coils without outside amplification. Alternative components which may be employed to operate the relays as specified include bistable multivibrator circuits or rotory commutator switches, for example.

A preferred embodiment of the invention has been described. Various changes and modifications may be made in the scope of the invention as set forth in the appended claims.

I claim:

1. A high-speed electromechanical switching system for individually switching a plurality of input circuits in sequence into an output circuit, comprising a predetermined smaller number of switching sections each having an input and an output, a separate portion of said input circuits being associated with each of said switching sections, said input circuits being individually connected to the input of the said switching section associated therewith and commonly connected to the output thereof, a separate switch having a movable contact connected in each said input circuit, the switches associated with the same switching section being adapted to close in sequence, only one of said switches being adapted to close at one time, synchronizing means for said switches connected to each said switching section, said synchronizing means being adapted to close a single switch at a time in each of said switching sections cyclically in sequence from switching section to switching section, a complete switching section cycle being preselected to permit a switch in any one switching section to completely close prior to the commencement of a succeeding cycle in said switching section, a plurality of gate circuits having input circuits each connected to the output of a separate one of said switching sections, said gate circuits having their outputs connected into a common single output circuit, synchronizing circuit means connected to said gate circuits and adapted to operate said gate circuits cyclically in sequence, only one of said gate circuits being adapted to operate at a time and each said gate circuit being adapted to operate once during each said switching section cycle, whereby the said input circuits are individually switched in sequence into the said common output circuit.

2. A high-speed electromechanical switching system in accordance with claim 1 which further comprises a mixer circuit having an input and an output, the outputs of said gate circuits being individually connected to the input of said mixer circuit and the output of said mixer circuit being connected to the said common output circuit.

3. A high-speed electromechanical switching system for individually switching a plurality of input circuits in sequence into an output circuit, comprising a predetermined smaller number of switching sections each having an input and an output, a separate portion of said input circuits being associated with each of said switching sections, said input circuits being individually connected to the input of the switching section associated therewith and commonly connected to the output thereof, a separate switch having a movable contact connected in each said input circuit, a separate stepping means for each said switching section adapted to close the switches associated therewith in sequence, only one of said switches being adapted to close at a time, synchronizing means for said stepping means connected to each said switching section, said synchronizing means being adapted to synchronize said stepping means to operate one switch at a time in each said switching section cyclically in sequence from switching section to switching section, a complete switching section cycle being preselected to permit a switch in any one switching section to completely close prior to the commencement of a succeeding cycle in said switching section, a plurality of gate circuits having input circuits each connected to the output of a separate one of said switching sections, said gate circuits having their output connected into a common output circuit, synchronizing circuit means connected to said gate circuits and adapted to operate said gate circuits cyclically in sequence in synchronism with the said cyclical operation of said stepping means, said circuit means being further adapted to maintain only one said gate circuit operative at a time and to operate each said gate circuit once during each said switching section cycle, whereby the said input circuits are individually switched in sequence into the said common output circuit.

4. A high-speed electromechanical switching system for individually switching a plurality of input circuits in sequence into an output circuit, comprising a predetermined smaller number of switching sections each having an input and an output, a separate portion of said input circuits being associated with each of said switching sections, said input circuits being individually connected to the input of the said switching section associated therewith and commonly connected to the output thereof, a separate electromagnetic relay connected in each said input circuit within said switching sections, a separate stepping circuit for each said switching section electrically connected to the electromagnetic relays therein, said stepping circuit being adapted to close said relays in sequence, only one of said relays being adapted to close at a time, first synchronizing circuit means for said stepping circuits electrically connected thereto in each said switching section, said first circuit means being adapted to synchronize the stepping circuits to operate one relay at a time in each said switching section cyclically in sequence from switching section to switching section, a complete switching section cycle being preselected to permit a relay in any one switching section to completely close prior to the commencement of a succeeding cycle in said switching section, a plurality of gate circuits having input circuits each connected to the output of a separate one of said switching sections, said gate circuits having their output connected into a common output circuit, second synchronizing circuit means connected to said gate circuits and adapted to operate said gate circuits cyclically in sequence in synchronism with the cyclical operation of the said stepping circuits, said second circuit means being adapted to maintain only one said gate circuit operative at a time and to operate each said gate circuit once during each said switching section cycle, whereby the said input circuits are individually switched in sequence into the said common output circuit.

References Cited in the file of this patent

UNITED STATES PATENTS 2,836,734   Cichanowicz _____ May 27, 1958